United States Patent
Morimura

(10) Patent No.: US 12,059,786 B2
(45) Date of Patent: Aug. 13, 2024

(54) STRIKING TOOL

(71) Applicant: MAX CO., LTD., Tokyo (JP)

(72) Inventor: Takashi Morimura, Tokyo (JP)

(73) Assignee: Max Co., Ltd., Tokyo (JP)

( * ) Notice: Subject to any disclaimer, the term of this patent is extended or adjusted under 35 U.S.C. 154(b) by 190 days.

(21) Appl. No.: 17/320,331

(22) Filed: May 14, 2021

(65) Prior Publication Data

US 2021/0354277 A1 Nov. 18, 2021

(30) Foreign Application Priority Data

May 14, 2020 (JP) .................................. 2020-085427

(51) Int. Cl.
| | |
|---|---|
| *B25C 1/06* | (2006.01) |
| *H02P 6/17* | (2016.01) |
| *H02P 6/24* | (2006.01) |
| *B25C 1/00* | (2006.01) |

(52) U.S. Cl.
CPC .................. *B25C 1/06* (2013.01); *H02P 6/17* (2016.02); *H02P 6/24* (2013.01); *B25C 1/008* (2013.01)

(58) Field of Classification Search
CPC ... B25C 1/06; B25C 1/008; H02P 6/17; H02P 6/24
See application file for complete search history.

(56) References Cited

U.S. PATENT DOCUMENTS

| | | | | |
|---|---|---|---|---|
| 3,366,302 | A * | 1/1968 | Blicharski | B25C 1/06 227/131 |
| 4,494,052 | A * | 1/1985 | Kelleher | G11B 19/28 318/400.29 |
| 4,622,499 | A * | 11/1986 | Squires | H02P 6/06 318/400.04 |
| 5,220,257 | A * | 6/1993 | Yoshino | H02P 6/24 318/400.03 |
| 5,511,715 | A * | 4/1996 | Crutcher | B25C 1/06 227/8 |
| 10,193,476 | B1 * | 1/2019 | Wang | H02P 6/08 |
| 2002/0108474 | A1 * | 8/2002 | Adams | B25C 1/06 81/487 |
| 2002/0134811 | A1 * | 9/2002 | Napier | B24B 23/04 227/134 |

(Continued)

FOREIGN PATENT DOCUMENTS

| | | |
|---|---|---|
| EP | 3479964 A1 | 5/2019 |
| JP | 2015030052 A | 2/2015 |

(Continued)

OTHER PUBLICATIONS

European Search Report for EP Application No. 21173851.3 dated Oct. 21, 2021. (10 pp.).

*Primary Examiner* — Lucas E. A. Palmer
(74) *Attorney, Agent, or Firm* — Banner & Witcoff, Ltd.

(57) ABSTRACT

A striking tool includes: a motor including a rotor; a plunger configured to be movable from a bottom dead point to a top dead point by the motor; a moving unit configured to move the plunger from the top dead point toward the bottom dead point; a speed variation acquiring unit configured to acquire an amount of variation in rotating speed of the rotor; and a control unit configured to control the motor, based on the amount of variation acquired by the speed variation acquiring unit.

18 Claims, 8 Drawing Sheets

(56) References Cited

U.S. PATENT DOCUMENTS

| | | | | |
|---|---|---|---|---|
| 2005/0220445 A1* | 10/2005 | Baskar | ...................... | B25C 1/06 388/811 |
| 2009/0179062 A1* | 7/2009 | Shima | ...................... | B25C 1/06 227/2 |
| 2010/0065294 A1* | 3/2010 | Hirabayashi | .............. | B25C 1/06 173/122 |
| 2011/0132959 A1* | 6/2011 | Hlinka | ...................... | B25C 1/06 227/8 |
| 2011/0303428 A1* | 12/2011 | Roth | ...................... | B25C 1/008 173/1 |
| 2011/0303724 A1* | 12/2011 | Groer | ...................... | B25C 1/06 227/129 |
| 2011/0303725 A1* | 12/2011 | Schaer | ...................... | B25C 1/06 227/129 |
| 2015/0158160 A1* | 6/2015 | Kato | ...................... | B25C 1/06 91/55 |
| 2016/0144495 A1* | 5/2016 | Raggl | ...................... | B25C 1/008 29/432 |
| 2016/0144496 A1* | 5/2016 | Raggl | ...................... | B25C 1/10 29/432 |
| 2016/0144497 A1* | 5/2016 | Boehm | ................... | B25C 1/143 29/432 |
| 2016/0167210 A1* | 6/2016 | Beck | ........................ | B25F 5/00 29/432 |
| 2017/0217004 A1* | 8/2017 | Kato | ........................ | B25C 5/15 |
| 2017/0234484 A1* | 8/2017 | Vanko | ................... | B24B 23/028 173/176 |
| 2018/0036870 A1* | 2/2018 | Komazaki | ................. | B25C 1/06 |
| 2018/0115266 A1* | 4/2018 | Koniakowsky | ........... | B25F 5/00 |
| 2019/0202043 A1* | 7/2019 | Noguchi | ................... | B25C 1/04 |
| 2020/0180130 A1* | 6/2020 | Wolf | ....................... | B25C 1/008 |
| 2021/0323131 A1* | 10/2021 | Hao | ....................... | B25C 1/047 |
| 2022/0355453 A1* | 11/2022 | Morimura | ................ | B25C 1/06 |

FOREIGN PATENT DOCUMENTS

| | | | | |
|---|---|---|---|---|
| JP | 2017136656 A | 8/2017 | | |
| JP | 2020028960 A | 2/2020 | | |
| WO | 2014-084221 A1 | 6/2014 | | |
| WO | WO-2014084221 A1 * | 6/2014 | ............... | B25C 1/04 |

\* cited by examiner

STRIKING TOOL

CROSS-REFERENCE TO RELATED APPLICATIONS

This application is based on and claims priority under 35 USC 119 from Japanese Patent Application No. 2020-085427 filed on May 14, 2020, the contents of which are incorporated herein by reference.

TECHNICAL FIELD

The present disclosure relates to a striking tool.

BACKGROUND ART

A striking tool configured to drive a plunger by using a motor, thereby striking a nail, a tack, a staple, a pin and the like (hereinbelow, referred to as "fastener") is known.

JP-A-2017-136656 (hereinafter, referred to as PTL 1) discloses the invention for suppressing a stop position of a plunger from changing and time required from striking from varying according to a change in battery voltage. Specifically, PTL 1 discloses a striking tool configured to control energization time to a motor, based on the battery voltage.

JP-A-2015-30052 (hereinafter, referred to as PTL 2) discloses a striking tool capable of moving a plunger to a position of an initial state more accurately by calculating an amount of rotation of a motor since detection of a peak in current flowing in the motor and determining a timing to stop the motor.

However, according to the striking tool disclosed in PTL 1, the energization time to the motor is set only based on the battery voltage. For this reason, if it is assumed that the plunger moves at the same speed every time, the plunger is expected to stop at the same position. However, actually, since the drive speed of the plunger varies due to diverse effects, it is difficult to stabilize the stop position of the plunger.

According to the striking tool disclosed in PTL 2, when it is not possible to detect the peak in current, it is difficult to determine a timing to stop the motor. For example, when a start load increases as the plunger stops at a further top dead point-side than expected and thus an upper limit value of current that can be caused to flow through an inverter is reached, even though a motor load increases after start, the current value does not vary from the upper limit value, so that it is difficult to detect the peak in current. For this reason, it may be difficult to stabilize the stop position of the plunger.

It is therefore an object of the present disclosure to provide a striking tool capable of stabilizing a stop position of a plunger.

SUMMARY OF INVENTION

A striking tool of a first aspect of the present disclosure includes: a motor including a rotor; a plunger configured to be movable from a bottom dead point to a top dead point by the motor; a moving unit configured to move the plunger from the top dead point toward the bottom dead point; a speed variation acquiring unit configured to acquire an amount of variation in rotating speed of the rotor; and a control unit configured to control the motor, based on the amount of variation acquired by the speed variation acquiring unit.

A striking tool of a second aspect of the present disclosure includes: a motor including a rotor; a plunger configured to be movable from a bottom dead point to a top dead point by the motor; a moving unit configured to move the plunger from the top dead point toward the bottom dead point; a speed acquiring unit configured to acquire a rotating speed of the rotor; and a control unit configured to control the motor, based on the rotating speed acquired by the speed acquiring unit.

BRIEF DESCRIPTION OF DRAWINGS

Exemplary embodiments of the present disclosure will be described in detail based on the following figures, wherein.

DESCRIPTION OF EMBODIMENTS

Figure 1:
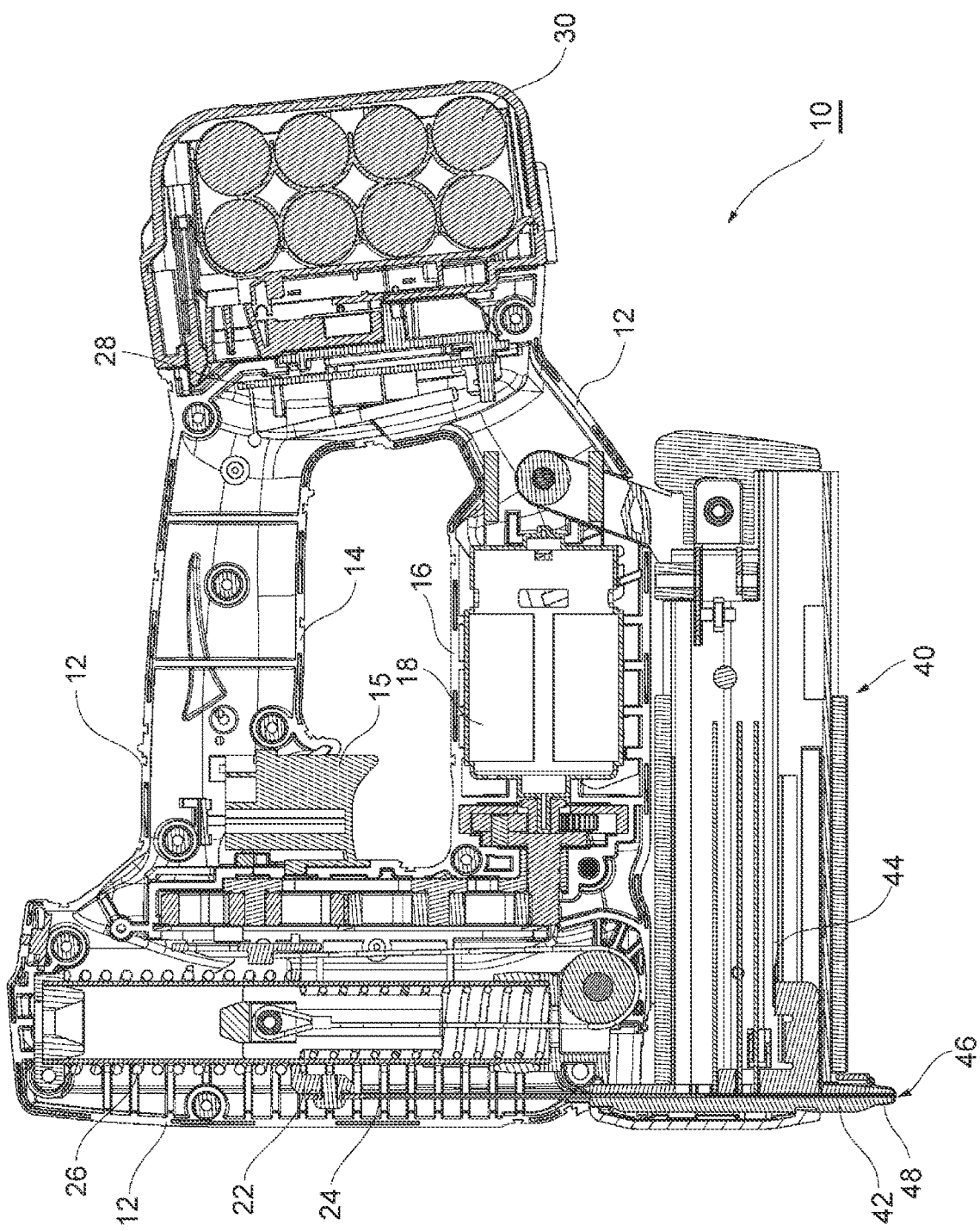
FIG. 1 is a sectional view of a striking tool 10.

Hereinafter, embodiments of the present disclosure will be described with reference to the drawings. The embodiments described below are examples for illustrating the present disclosure, and are not intended to limit the present disclosure to the embodiments. The upper direction on the drawing sheet of FIG. 1 may be referred to as the upper, the lower direction on the drawing sheet may be referred to as the lower, the left direction on the drawing sheet may be referred to as the left, and the right direction on the drawing sheet may be referred to as the right. However, they are just convenient expressions for illustrating the relative positional relations.

First Embodiment

FIG. 1 is a sectional view of an electric striking tool 10 in accordance with a first embodiment. The striking tool 10 includes a plunger 22 that can move between a top dead point and a bottom dead point, a driver 24 fixed to the plunger 22 and configured to strike out a fastener downward, a motor 18 for moving the plunger 22 from the bottom dead point toward the top dead point, and a spring 26 (an example of the "moving unit") for moving the plunger 22 from the top dead point toward the bottom dead point. In a housing 12, components including the plunger 22 are accommodated. The housing 12 is provided with a grip 14 and an auxiliary grip 16 that are gripped by an operator. The grip 14 is formed to have a pillar shape extending in the upper and lower direction (a right and left direction in FIG. 1) so that the operator can easily grasp the same, for example. When a trigger 15 is pressed by a user, a battery 30 and the motor 18 are made conductive, thereby activating the striking tool 10. The trigger 15 is provided exposed on a front surface of the grip 14, and is urged forward by an urging member such as a spring. The battery 30 can be detachably mounted to an end portion of the housing 12.

The battery 30 is a DC power supply for supplying power for driving the striking tool 10. The battery 30 is constituted by a lithium ion battery that can output a predetermined DC voltage, for example. The battery 30 is mounted to the striking tool 10, so that the stroking tool can be used with being carried. However, the striking tool 10 may also be configured so that the battery is accommodated in the housing 12. In this case, the battery may be charged together with the striking tool 10.

Figure 2:
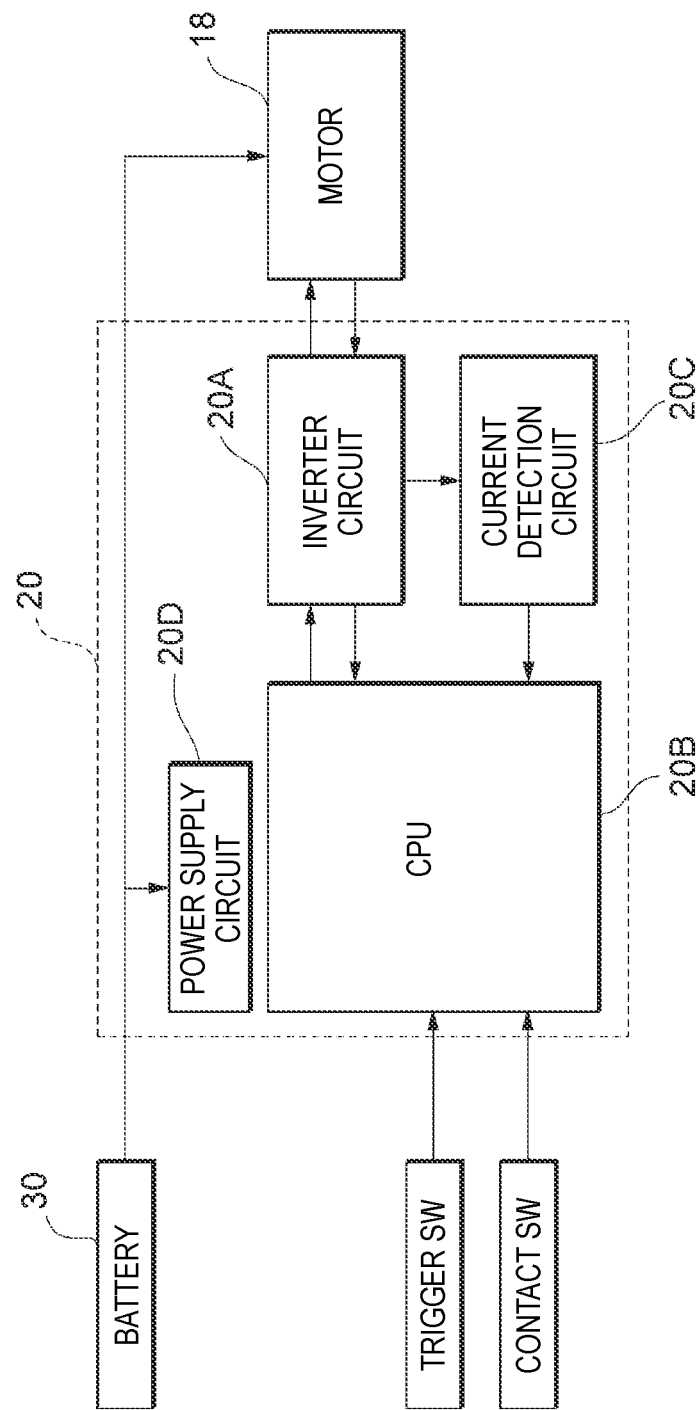
FIG. 2 is a control block diagram of the striking tool 10.

The striking tool 10 also includes a plurality of gears (not shown) that is engaged with the plunger 22, a printed circuit board 28 on which a control circuit 20 (an example of the "control unit"; FIG. 2) for controlling the motor 18 is mounted, and the trigger 15 for starting drive of the motor 18. The plunger 22 and the gears are engaged to each other, so that as the gears are rotated, the plunger 22 can move from the bottom dead point toward the top dead point against an elastic force of the spring 26. When the plunger 22 reaches the top dead point, the engaged state of the plunger 22 and the gears is released. Since the spring 26 is provided to urge the plunger 22 downward, when the plunger 22 reaches the top dead point, the plunger 22 and the driver 24 fixed to the plunger are moved downward by the elastic force of the spring 26. A configuration of the control circuit 20 will be described later.

The striking tool 10 also includes a magazine 40 that is attached to a lower part of the housing 12 and can load therein a plurality of coupled fasteners. A front end portion of the magazine 40 is provided with a nose part 42. In the magazine 40, a pusher 44 for urging the fastener toward the nose part 42 is provided. When a fastener at a front end is struck out, an adjacent fastener is supplied to the nose part 42. A tip end of the nose part 42 is provided with an ejecting port 46 and a contact arm 48. The fastener struck out by the driver 24 is struck out downward from the ejecting port 46. The contact arm 48 is provided to protrude from the ejecting port 46 around the ejecting port 46 and functions as a safety device that allows striking of a fastener in a state where the contact arm is pressed against an object to which a fastener is to be struck.

FIG. 2 is a control block diagram of the striking tool 10. The motor 18 is, for example, a DC brushless motor having a rotor and a stator having a three-phase winding (an example of the "stator winding"). When three-phase AC current is enabled to flow through the three-phase winding to generate a rotating magnetic field, the rotor having a permanent magnet can be rotated. As shown in FIG. 1, the motor 18 is mounted in an internal region of the auxiliary grip 16. A rotary shaft of the rotor of the motor 18 is provided perpendicular to a moving direction (upper and lower direction) of the plunger 22, for example. Note that, as described later, the motor 18 is not provided with a position detection sensor for detecting a position of the rotor of the motor 18, such as a Hall IC. However, a position detection sensor for detecting a position of the rotor of the motor 18 may be provided.

The control circuit 20 includes an inverter circuit 20A for applying a DC voltage to the three-phase winding of the motor 18, a CPU 20B (an example of the "speed acquiring unit" and the "speed variation acquiring unit") configured to generate a control signal for switching the inverter circuit 20A and to supply the control signal to the inverter circuit 20A, a current detection circuit 20C for detecting current flowing through the three-phase winding of the motor 18, and a power supply circuit 20D configured to supply a voltage output from the battery 30 to each active component such as the CPU 20B.

The inverter circuit 20A has six switching elements connected in a three-phase bridge manner between a power supply line and a ground line connected to output terminals of the battery 30 and each constituted by a FET (Field Effect Transistor) or an IGBT (Insulated Gate Bipolar Transistor) and free Wheel diodes parallel-connected to the switching elements, for example. Three output terminals of the inverter circuit are each connected to the three-phase winding of the motor 18.

The CPU 20B includes a storage device constituted by a semiconductor memory such as a ROM in which firmware (computer program) for controlling the motor 18 is stored, a processor for executing the firmware, and a driver configured to generate a control signal for controlling each switching element of the inverter circuit 20A in a PWM manner. The CPU 20B is configured to generate a control signal for controlling each switching element of the inverter circuit 20A in a PWM (pulse width modulation) manner and to output the same to a control terminal (a base or a gate) of each switching element.

The CPU 20B is also configured to acquire a rotating speed of the rotor of the motor 18, based on a phase voltage of the motor 18, and information indicative of an amount of variation in rotating speed. More specifically, the CPU 20B acquires the information indicative of the rotating speed of the rotor of the motor 18 by acquiring information indicative of a time at which a back electromotive voltage generated in a non-energized phase becomes a zero cross point, and acquires the information indicative of the amount of variation in rotating speed, based on the acquired information. A method of calculating the rotating speed of the motor 18 and the amount of variation in rotating speed will be described in detail later. Note that, as for the phase voltage, a phase voltage of one winding of the three-phase winding may be acquired or phase voltages of windings of two phases or all phases may be acquired. The information indicative of the rotating speed may also be acquired using a position detection sensor such as a Hall IC. In addition, a phase voltage detection circuit for detecting a phase voltage may be separately provided between the CPU 20B and the inverter circuit 20A. The phase voltage detection circuit is configured to receive an analog phase voltage (FIG. 4), as an input, and to output a digital signal obtained by binarizing the analog phase voltage, for example.

The current detection circuit 20C is a circuit for detecting current flowing through the three-phase winding of the motor 18. The current detection circuit 20C has a resistor element having one end connected to the inverter circuit 20A and the other end connected to the ground line, for example. The current according to the current flowing through the three-phase winding of the stator flows through the resistor element. Since the current flowing through the three-phase winding varies according to torque of the motor 18, it is possible to acquire information indicative of the current flowing through the three-phase winding by detecting, as a detected voltage, an amount of voltage drop based on the current flowing through the resistor element. The current detection circuit 20C is configured to supply information indicative of the detected voltage to the CPU 20B. The current detection circuit 20C may be configured to detect current of one winding of the three-phase winding or currents of windings of two phases or all phases.

Figure 3:
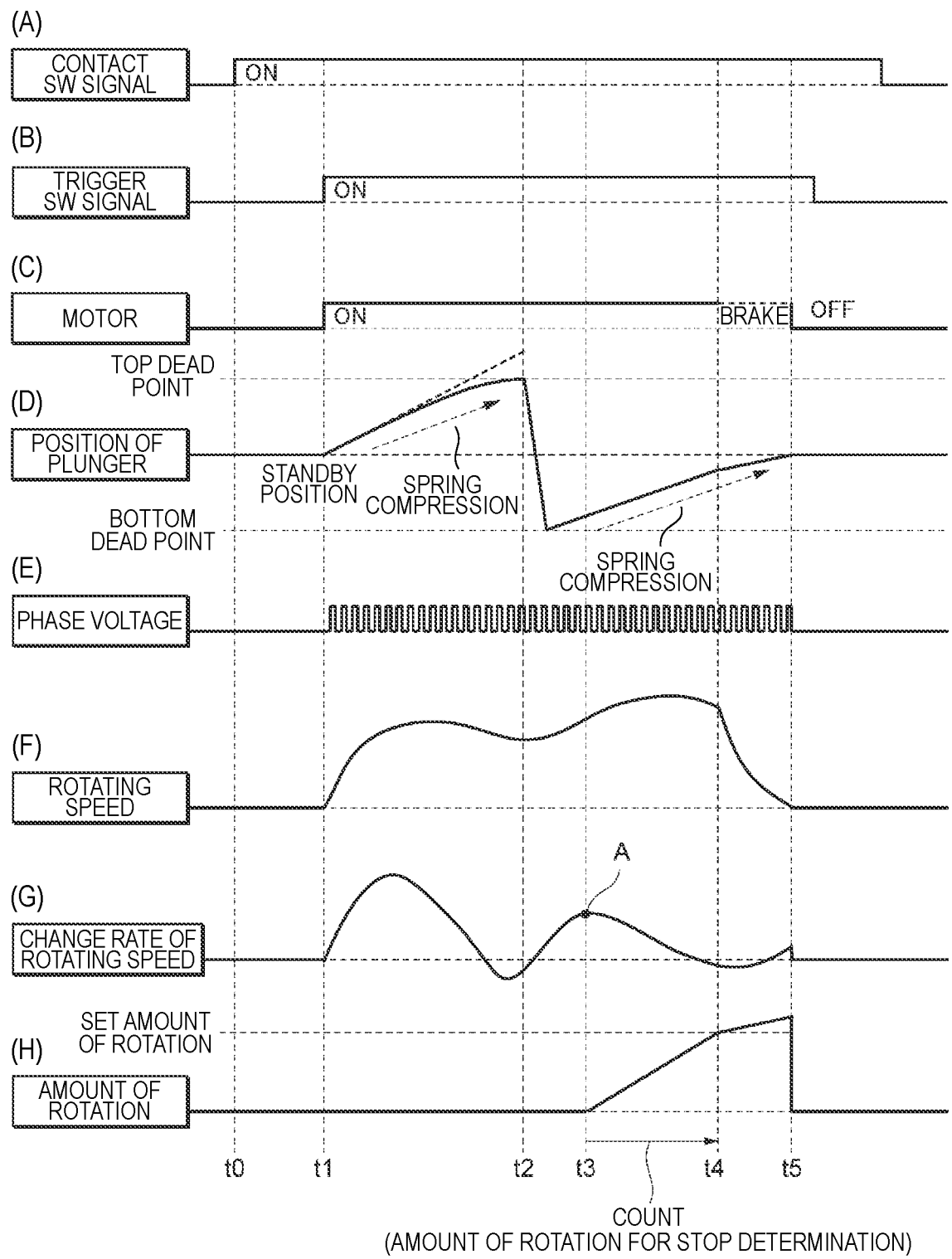
FIG. 3 is a timing chart depicting a striking method by the striking tool 10.
Figure 4:
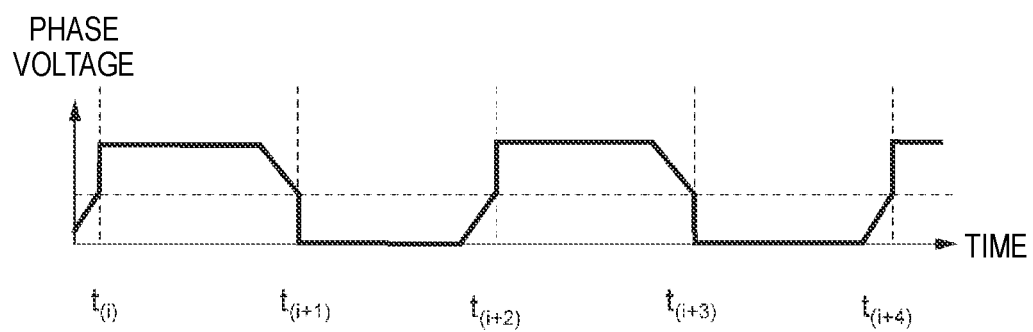
FIG. 4 depicts an example of a phase voltage of a motor 18.

Hereinafter, a striking method using the striking tool 10 of the present embodiment is described. FIG. 3 is a timing chart depicting a striking method by the striking tool 10. FIG. 4 is a pictorial view depicting a phase voltage of the motor 18.

In FIG. 3, the horizontal axis indicates time, (A) of FIG. 3 depicts a contact SW signal indicating whether the contact arm 48 is in contact with an object into which a fastener is to be struck. At time t0, when the contact arm 48 comes into contact with the object, the contact SW signal becomes ON. The CPU 20B receives the contact SW signal, and detects that the contact arm 48 is in contact with the object. Thereafter, the contact SW signal keeps the ON state as long as the contact arm 48 is in contact with the object.

(B) of FIG. 3 depicts a trigger SW signal indicating whether the trigger 15 is pressed. At time 11, when the operator presses the trigger 15, the trigger SW signal becomes ON. The CPU 20B receives the trigger SW signal, and detects that the trigger 15 is pressed. Thereafter, the trigger SW signal keeps the ON state as long as the trigger 15 is pressed.

(C) of FIG. 3 depicts a state of the motor 18. At time t1, when both the trigger SW signal and the contact SW signal become ON, the CPU 20B generates a control signal for controlling the inverter circuit 20A by using the driver, and supplies the same to the inverter circuit 20A. Each switching element of the inverter circuit 20A performs a switching operation, based on the control signal from the CPU 20B. When the switching element becomes ON, the power supply voltage supplied from the battery 30 is applied to the three-phase winding of the motor 18. The rotor of the motor 18 starts to rotate according to the rotating magnetic field generated by the three-phase winding.

(D) of FIG. 3 depicts a position of the plunger 22. In an initial state before time t0, the plunger 22 stops at an intermediate standby position between the top dead point and the bottom dead point. At time t1, when the motor 18 starts to drive, the gears connected to the rotary shaft of the rotor of the motor 18 start to rotate. The gears are provided with a torque roller for engaging with the plunger 22, for example, and the torque roller rotates as the gears rotate. The plunger 22 is provided with an engaging part for engaging with the gears, and the engaging part is pressed upward by the torque roller of the gears. Although the plunger 22 is urged downward by the elastic force of the spring 26, the plunger 22 is moved upward against the elastic force by the torque roller of the gears. As the plunger 22 is moved upward, the spring 26 engaged with the plunger 22 is compressed. Note that, the plurality of gears may be arranged from the bottom dead point to the top dead point, each of the gears may be provided with the torque roller, and the torque roller of the different gear and the different engaging part of the plunger 22 may be engaged according to a position of the plunger 22.

(E) of FIG. 3 and FIG. 4 depict the phase voltage generated in one winding of the three-phase winding. FIG. 4 depicts a graph where the horizontal axis indicates time and the vertical axis indicates the phase voltage generated in one winding of the three-phase winding. As shown in (E) of FIG. 3 and FIG. 4, the back electromotive voltage is generated in the three-phase winding as the rotor of the motor 18 rotates. Therefore, it is possible to detect the back electromotive voltage in a non-energized phase. The CPU 20B can acquire the information indicative of the rotating speed of the rotor of the motor 18 by detecting the zero cross points at which a terminal voltage of the motor 18 of the non-energized phase becomes a midpoint potential of the power supply voltage, and acquiring information indicative of an interval of the zero cross points. In FIG. 4, at time $t_{(i)}$, time $t_{(i+1)}$, time $t_{(i+2)}$, time $t_{(i+3)}$ and time $t_{(i+4)}$, the zero cross point is detected. Therefore, the CPU 20B can acquire information indicative of a rotation cycle of the motor 18 by multiplying an interval of time $t_{(i)}$ and time $t_{(i+1)}$ by N (N: the number of poles of magnets of the rotor), and acquire the information indicative of the rotating speed of the rotor of the motor 18 at the corresponding time by calculating a reciprocal thereof. Similarly, the CPU 20B can acquire information indicative of a rotation cycle of the motor 18 by multiplying an interval of time $t_{(i+1)}$ and time $t_{(i+2)}$ by N, and acquire the information indicative of the rotating speed of the rotor of the motor 18 at the corresponding time by calculating a reciprocal thereof.

The CPU 20B also acquires the information indicative of the amount of variation in rotating speed of the rotor of the motor 18. Specifically, the CPU 20B acquires the information indicative of the amount of variation in rotating speed by calculating a difference between the rotating speed calculated based on the interval of time $t_{(i)}$ and time $t_{(i+1)}$ and the rotating speed calculated based on the interval of time $t_{(i+1)}$ and time $t_{(i+2)}$. Therefore, the CPU 20B can detect whether the rotor of the motor 18 is accelerating or decelerating. By acquiring the information indicative of the amount of variation in rotating speed with a sufficient small time interval, the CPU 20B can acquire information indicative of a change rate of the rotating speed of the motor 18.

(F) of FIG. 3 indicates the rotating speed of the rotor of the motor 18 acquired by the CPU 20B. (G) of FIG. 3 depicts the change rate of the rotating speed of the rotor of the motor 18 acquired by the CPU 20B. As shown in (F) of FIG. 3, the rotating speed of the motor 18 is not always constant. The rotating speed of the motor 18 increases immediately after time t1 at which the motor 18 starts to drive. For this reason, as shown in (G) of FIG. 3, the change rate of the rotating speed of the motor 18 is a positive value. At this time, the plunger 22 moves toward the top dead point.

As the plunger 22 comes closer to the top dead point, the spring 26 is further compressed, so that the force of the spring 26 pressing the plunger 22 downward increases. For this reason, the rotating speed of the plunger 22 decreases as the plunger 22 comes closer to the top dead point.

As shown in (D) of FIG. 3, at time t2, the plunger 22 reaches the top dead point. At this time, the engaged state of the plunger 22 and the gear is released. For this reason, the plunger 22 is moved from the top dead point toward the bottom dead point by the elastic force of the compressed spring 26. On the other hand, since the CPU 20B outputs the control signal for rotating the rotor of the motor 18 to the inverter circuit 20A, the rotor of the motor 18 continues to rotate. Here, since the engaged state of the plunger 22 and the gear is released and thus the gear is released from the plunger 22 to which the force of impeding the rotation of the motor 18 is applied, the rotating speed of the rotor of the motor 18 increases after dime 12, as shown in (F) of FIG. 3. Also, as shown in (G) of FIG. 3, as the rotating speed of the rotor of the motor 18 increases, the change rate of the rotating speed also increases.

When the plunger 22 reaches the vicinity of the bottom dead point, the driver 24 that is moving downward together with the plunger 22 strikes out the fastener supplied to the nose part 42. The fastener is struck out downward from the ejecting port 46.

When the plunger 22 reaches the bottom dead point, the gear connected to the rotary shaft of the rotor of the motor 18 is again engaged with the plunger 22. For this reason, the plunger 22 starts to move toward the top dead point. As the plunger 22 moves upward, the spring 26 engaged with the plunger 22 is compressed. Since the spring 26 is further compressed as the plunger 22 moves further upward, the force of pressing the plunger 22 downward increases. For this reason, as shown in (G) of FIG. 3, the change rate of the rotating speed takes a local maximum point A, at which the change rate changes from an increase to a decrease, at time t3. The CPU 20B detects the local maximum point A and time t3. Note that, as shown in (F) of FIG. 3, even after the change rate of the rotating speed takes the local maximum point A, when the change rate of the rotating speed is positive, the rotating speed increases.

(H) of FIG. 3 depicts the amount of rotation of the rotor of the motor 18 acquired by the CPU 20B. As shown in (H) of FIG. 3, when the CPU 20B detects the local maximum point A, the CPU 20B starts to measure the amount of rotation of the rotor of the motor 18. Specifically, the CPU 20B calculates the amount of rotation by counting the number of the zero cross points shown in FIG. 4.

As shown in (H) of FIG. 3, at time t4, when the amount of rotation acquired by the CPU 20B reaches a predetermined set amount of rotation (for example, 20 rotations), the CPU 20B starts deceleration control for decelerating the rotation of the motor 18, for example, brake control as an example of the deceleration control. Specifically, the CPU 20B generate a PWM signal having a duty ratio smaller than usual rotation, and outputs the same to each switching element of the inverter circuit 20A. Therefore, as shown in (F) of FIG. 3, the rotating speed of the rotor of the motor 18 largely decreases. Note that, as shown in (D) of FIG. 3, even when the rotating speed of the motor 18 decreases, the plunger 22 continues to move gently toward the top dead point because the motor 18 is rotating.

Note that, for the deceleration control of decreasing the rotating speed of the rotor of the motor 18, a variety of methods can be adopted. For example, a short-circuit brake where energization to an upper-side arm of an inverter circuit is turned off and only a lower-side arm is energized may be adopted. In this case, a braking force (brake force) is high. However, an amount of heat generation in the motor is large. In addition, a regenerative brake cannot be used.

In addition, chopper control (chopper brake) may be performed on a short-circuit brake by generating a PWM signal for turning off energization to the upper-side arm of the inverter circuit and energizing only the lower-side arm and energizing the lower-side arm based on the PWM signal. In this case, as compared to the short-circuit brake, the braking force (brake force) is lowered but the amount of heat generation in the motor can be suppressed. In addition, a regenerative brake can be used.

Further, an open brake of turning off energization to the upper-side arm and the lower-side arm of the inverter circuit may be adopted. In this case, the braking force is highly lowered but the amount of heat generation in the motor can also be highly suppressed. In addition, a regenerative brake cannot be used.

On the other hand, when the user continuously uses the striking tool, a temperature of the motor rises, so that a failure of the motor may be caused due to heat, an operation of the tool may be stopped by a temperature protection function and other operation interruptions may be caused. Therefore, it is preferably to reduce the amount of heat generation in the motor. On the other hand, the braking force of the motor is also required so as to stabilize the standby position of the motor.

Therefore, the inventors studied diverse methods, and adopted a chopper brake where the energization to the upper-side arm (or the lower-side arm) of the inverter circuit 20A is turned off, a PWM signal is generated and only the lower-side arm (or the upper-side arm) is energized based on the PWM signal. It is possible to change the current flowing through the motor 18, which directly influences the braking force of the motor 18 and the amount of heat generation in the motor 18, according to a duty ratio of the PWM signal and the rotating speed of the rotor. Therefore, by adopting the chopper brake and setting a PWM signal having an appropriate duty ratio, it is possible to stabilize the stop position of the plunger by using the braking force of the motor, and to continuously use the striking tool 10 by reducing the amount of heat generation in the motor 18. In addition, since a reflux path (regeneration) from the motor 18 to the battery 30 via the inverter circuit 20A is formed, it is possible to charge the battery 30 during the brake control. Therefore, it is possible to suppress lowering of the battery 30 and to improve the operation efficiency. Note that, as the brake control, only the upper-side arm of the inverter circuit may be energized or only the upper-side arm may be energized based on the PWM signal and the energization to the lower-side arm may be turned off.

Thereafter, at time t5, the rotation of the rotor of the motor 18 is stopped. The timing to stop the rotation of the motor 18 can be appropriately set. For example, a control signal pattern for brake control where when the CPU 20B outputs a control signal having a predetermined pattern to the inverter circuit 20A, the motor 18 is stopped may be prepared. In addition, the CPU 20B may generate and output a control signal to the inverter circuit 20A so that the amount of rotation is continuously acquired even after time t5 and the motor 18 is stopped when a predetermined amount of rotation is reached.

Figure 5:
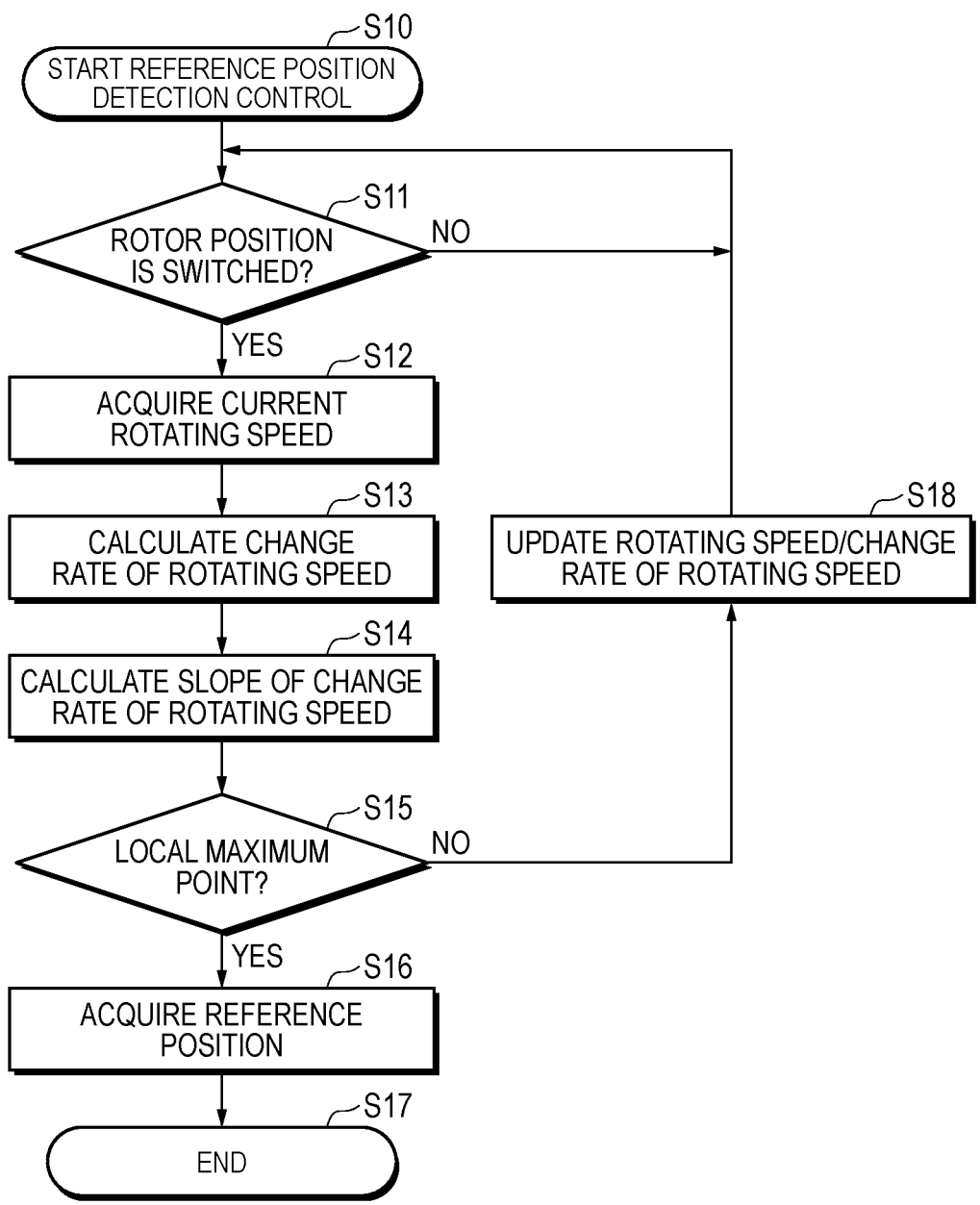
FIG. 5 is a flowchart depicting a method of detecting a reference position of a plunger 22.

FIG. 5 is a flowchart specifically depicting a process of detecting a reference position for controlling the stop position of the plunger 22 of the series of processes.

In step S10, the CPU 20B starts a process for detecting a reference position. Note that, it is not necessarily required to start the reference position detecting process from time t1 at which the motor 18 starts to drive. For example, the reference position detecting process may be executed after a predetermined time elapses (for example, a timing before the plunger 22 reaches the top dead point) by using the counter after the motor 18 starts to drive.

Then, the CPU 20B determines whether the position of the rotor of the motor 18 is switched (step S11). For example, as shown in FIG. 4, the CPU 20B may perform the determination by detecting the zero cross point of the phase voltage. In a striking device where a Hall IC is used, the determination may be performed by acquiring a signal of the Hall IC.

When it is determined in step S11 that the position of the rotor of the motor 18 is switched (YES), the CPU 20B acquires information indicative of a current rotating speed of the rotor of the motor 18 (step S12). Since the example of the method of acquiring the information indicative of the rotating speed has been described, the descriptions are omitted. On the other hand, when it is determined that the position of the rotor of the motor 18 is not switched (NO), step S11 is again executed.

The CPU 20B calculates an amount of variation in rotating speed, based on the acquired information indicative of the rotating speed (step S13). Since the example of the method of acquiring the information indicative of the amount of variation in rotating speed has been described, the descriptions are omitted.

The CPU 20B calculates an amount of variation of the amount of variation in rotating speed, based on the information indicative of the calculated amount of variation in rotating speed (step S14). Specifically, the CPU 20B can acquire a slope of a thane rate of the number of rotations by calculating a difference between a previous amount of variation in rotating speed and a current amount of variation in rotating speed.

Then, the CPU 20B determines whether the amount of variation in rotating speed has reached a local maximum point. Specifically, the CPU 20B determines whether a slope of a previous change rate of the number of rotations is positive and a slope of a current change rate of the number of rotations is negative (step S15). Note that, the local maximum point may also be detected by other information or other methods. For example, when the slope of the change rate of the number of rotations is positive for two consecutive times and the slope of a consecutive change rate of the number of rotations is negative for two consecutive times, it may be determined that the local maximum point is reached.

Figure 6:
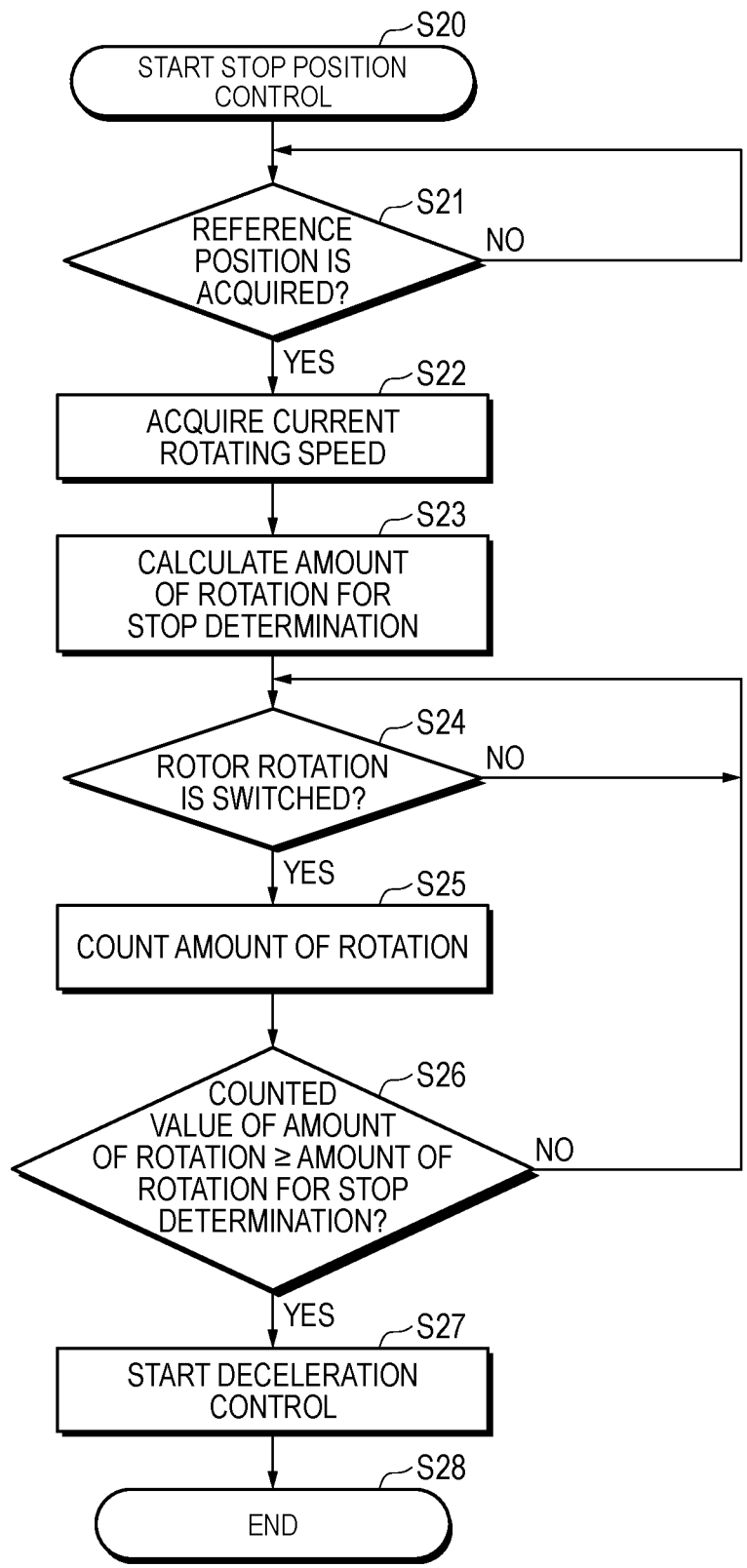
FIG. 6 is a flowchart depicting a method of controlling a stop position of the plunger 22.

In step S15, when it is determined that the amount of variation in rotating speed has reached the local maximum point (YES), the CPU 20B acquires a reference position for controlling the stop position of the plunger 22 (step S16, time t3), ends the reference position acquiring process, and starts a stop control process of the motor 18 shown in FIG. 6 (step S17).

On the other hand, when it is determined in step S15 that the amount of variation in rotating speed has not reached the local maximum point, the CPU 20B updates the rotating speed acquired in step S12 and the amount of variation in rotating speed acquired in step S13 as the current rotating speed and amount of variation in rotating speed (step S18), and re-executes step S11.

FIG. 6 is a flowchart specifically depicting a stop control process for the plunger 22 of the series of processes.

In step S20, the CPU 20B starts a stop control process for the plunger 22. Note that, it is not necessarily required to start the stop control process after the reference position detecting process is completed. By including a determination step (step S21) of determining whether a reference position is acquired, both processes may be executed in parallel. On the contrary, when the stop control process is necessarily executed after the reference position detecting process is completed, step S21 may not be included. Although the process shown in FIG. 5 is referred to as the reference position detecting process of detecting the reference position of the plunger 22 and the process shown in FIG. 6 is referred to as the stop control process of controlling the stop position of the plunger 22, since the plunger 22 is stopped by stopping the rotation of the rotor of the motor 18, it can be said that the processes shown in FIGS. 5 and 6 depict a method of controlling the motor 18.

The CPU 20B determines whether a reference position for stopping the plunger 22 is acquired (step S21).

When it is determined in step S16 that the reference position is acquired (YES), the CPU 20B acquires information indicative of a current rotating speed of the rotor of the motor 18 (step S22). Since the example of the method of acquiring the information indicative of the rotating speed has been described, the descriptions are omitted.

On the other hand, when it is determined that the reference position for stopping the plunger 22 is not acquired (NO), step S21 is re-executed.

Then, the CPU 20B calculates and sets an amount of rotation for stop determination (set amount of rotation), which is a reference for starting the deceleration control, based on the rotating speed acquired in step S22 (step S23). For example, when the rotating speed of the rotor acquired in step S22 is large, the CPU 20B sets a small amount of rotation for stop determination, and when the rotating speed of the rotor is small, the CPU 20B sets a large amount of rotation for stop determination. Even when a similar striking operation is executed according to temporal change of each component of the striking tool 10, for example, the speed of the plunger 22, the rotating speed of the rotor of the motor 18 and the like may vary. Therefore, the striking tool 10 is configured to acquire the rotating speed of the rotor of the motor 18 and to control the motor 18 based on the rotating speed. The rotating speed of the rotor that is used for control by the CPU 20B is preferably a rotating speed of the rotor after the plunger 22 has reached the bottom dead point. As shown in (F) of FIG. 3, after the plunger 22 has reached the bottom dead point, the rotating speed of the rotor of the motor 18 is larger and thus the rotating speed of the rotor largely varies. Therefore, it is possible to stabilize the stop position of the plunger 22 by controlling the motor 18 based on the information indicative of the rotating speed of the rotor after the plunger 22 has reached the bottom dead point. Note that, a function for setting the amount of rotation for stop determination set amount of rotation), which is a reference for starting the deceleration control, based on the rotating speed can be appropriately designed according to an actual configuration of the striking device.

Then, the CPU 20B determines whether the position of the rotor of the motor 18 is switched (step S24). Since the example of the method of determining whether the position of the rotor is switched has been described, the descriptions are omitted.

When it is determined in step S24 that the position of the rotor of the motor 18 is switched (YES), the CPU 20B starts to count the amount of rotation of the rotor of the motor 18 (step S25). Specifically, the CPU 20B may count the amount of rotation of the rotor by counting the number of times of detection of the zero cross point of the phase voltage.

On the other hand, when it is determined in step S24 that the position of the rotor of the motor 18 is not switched (NO), step S24 is re-executed.

The CPU 20B determines whether the amount of rotation of the rotor counted in step S25 is equal to or larger than the amount of rotation for stop determination set in step S23 (step S26).

When it is determined that the amount of rotation of the rotor counted in step S25 is equal to or larger than the amount of rotation for stop determination set in step S23 (YES), the CPU 20B starts the deceleration control (for example, brake control) for decelerating the rotation of the motor 18 (step S27, time t4). Since the example of the brake control method has been described, the descriptions are omitted.

On the other hand, when it is not determined that the amount of rotation of the rotor counted in step S25 is equal to or larger than the amount of rotation for stop determination set in step S23 (NO), step S24 is re-executed.

When the CPU 20B completes the brake control, the control circuit 20 including the CPU 20B ends the control on the motor 18 (step S28). At this time, the rotation of the rotor of the motor 18 is stopped. The plunger 22 is also stopped at the stop position (standby position).

Note that, when continuously striking the fasteners, the operations after time t1 in FIG. 3 are repeated after time t5.

According to the striking tool 10 as described above, the control circuit 20 is configured to control the motor 18 based on the amount of variation in rotating speed of the rotor of the motor 18. Even when an absolute value of the rotating speed varies due to a decrease in battery voltage, temporal change of a component, and the like, it is possible to stabilize the stop position of the plunger. Therefore, it is possible to reduce variation in response time until the striking is executed from the stop position.

According to a method of detecting a position of the top dead point of the plunger and the like on the basis of a peak value in current and the like, it may be difficult to identify inrush current upon start and current that occurs depending on a position of the plunger. For example, when the stop position of the plunger is located on the further top dead point-side than expected, the start load increases and saturation occurs, so that it may be difficult to detect the peak in current. According to the striking tool 10 of the present embodiment, the amount of variation in rotating speed of the motor is acquired and the motor is controlled based on the amount of variation, so that it is possible to reduce a risk of false detection and to thus stabilize the stop position of the plunger.

In addition, it is possible to reduce a sensor (typically, a microswitch) for detecting the top dead point. Since the striking tool is required to have high dustproof and waterproof performance, it is necessary to appropriately mount the microswitch, considering dust, machine oil, instruction of water from the outside, and the like. However, as a mechanical contact point of the microswitch wears due to shock during striking, chattering occurs and the sensor cannot properly detect the top dead point. As countermeasures against the chattering, it is considered to provide a filter circuit. However, filtering causes a time lag until a signal is determined. According to the striking tool 10 of the present embodiment, it is possible to control the motor without using the microswitch. However, a microswitch may be provided and the motor and the position of the plunger may be controlled in conjunction with information acquired from the microswitch.

Similarly, it is possible to reduce the Hall ICs. Since the Hall IC is also required to have dustproof and waterproof performance, like the microswitch, the installation of the Hall IC causes enlargement of the striking device and increases the cost. According to the striking tool 10 of the present embodiment, it is possible to control the motor without using the Hall IC. However, the Hall IC may be provided, the information indicative of the amount of variation in rotating speed may be acquired from the information from the Hall IC, and the motor and the position of the plunger may be controlled based on the acquired information.

Note that, the control circuit 20 detects, as the information indicative of the amount of variation in rotating speed, the local maximum point of the change rate of the rotating speed, and uses the same for control on the motor 18. However, the present disclosure is not limited thereto. For example, when the change rate of the rotating speed exceeds a threshold value, it may be detected and used for control on the motor. Alternatively, other inflection points of the change rate of the rotating speed may be detected and used for control on the motor. Alternatively, the above information and the information indicative of the rotating speed may be combined and used for control on the motor. In addition, a waveform of a change rate of the rotating speed to be assumed may be prepared in advance and compared to a waveform of the change rate of the rotating speed, and the motor may be controlled based on the comparison. However, the local maximum point of the change rate of the rotating speed of the motor is a feature that always occurs after striking of the plunger. Therefore, it is possible to suppress false detection by detecting the local maximum point.

The inventors also noticed a case where even when the amount of variation in rotating speed is similar, the absolute value of the rotating speed is different, and controlled the position of the plunger based on the rotating speed, in addition to the amount of variation in rotating speed. For example, there is a case where the rotating speed of the rotor is different even at the same timing, due to wears of main components of the striking device.

Therefore, the inventors controlled the position of the plunger based on the rotating speed, in addition to the amount of variation in rotating speed. By this configuration, it is possible to control the stop position of the plunger more accurately.

For example, when the absolute value of the rotating speed of the rotor is large, the plunger may be stopped on a further top dead point-side than expected, in usual brake control. On the other hand, when the absolute value of the rotating speed of the rotor is small, the plunger may be stopped on a further bottom dead point-side than expected, in usual brake control. Therefore, when the motor is controlled based on the rotating speed of the rotor at a predetermined timing, the variation in stop position of the plunger due to variation in rotating speed of the rotor can be suppressed.

When the rotor rotates at a first rotating speed, the control circuit 20 of the striking tool 10 of the present embodiment controls the motor 18 to stop the plunger 22 at a first position (for example, an intermediate point between the top dead point and the bottom dead point). Here, when the rotor rotates at a second rotating speed lower than the first rotating speed due to temporal change, a decrease in battery voltage and the like, if the same stop control as the stop control in the case of the first rotating speed is applied, the plunger may stop on the bottom dead point-side immediately before the first position without reaching the first position. Therefore, the motor 18 is controlled according to a reference rotating speed to stop the plunger at substantially the same position even when the reference rotating speed varies. Specifically, the amount of rotation for stop determination is set smaller than the case of the first rotating speed, and the timing to start the stop control process for the plunger 22 is delayed. Thereby, it is possible to control the motor 18 to stop the plunger 22 at the same first position as the case where the rotor rotates at the first rotating speed or in the vicinity of the first position. Note that, a control signal pattern where a duty ratio in the stop control process is set larger in the case where the rotor rotates at the second rotating speed than in the case where the rotor rotates at the first rotating speed may also be prepared. Thereby, the plunger 22 may stop at the same first position as the case where the rotor rotates at the first rotating speed or in the vicinity of the first position.

Here, as for the first rotating speed and the second rotating speed, the rotating speed of the rotor at predetermined timing is preferably acquired. The striking tool 10 of the present embodiment acquires the rotating speed based on the detection that the amount of variation in rotating speed has reached the local maximum point (step S22). Therefore, it is possible to control the motor 18, based on the rotating speed at timing at which the rotating speed is sufficiently high.

However, the present disclosure is not limited thereto. For example, the maximum values of the rotating speed of the rotor (the maximum values of the rotating speed of the rotor occurring for a time period from time t3 to time t4 in (F) of FIG. 3) may be acquired as the first rotating speed and the second rotating speed, and the stop position of the plunger may be controlled based on the maximum values.

The striking tool 10 of the present embodiment acquires the information indicative of the rotating speed of the rotor, based on the phase voltage, but may also acquire the information indicative of the rotating speed of the rotor, based on phase current, for example.

Note that, a variety of techniques can be used for moving the plunger by using the gears to be driven by the motor, releasing the engaged state of the gear or so on and the plunger at the top dead point, and moving the plunger toward the bottom dead point. For example, the means disclosed in PTL 1 and PTL 2 can be adopted.

The present disclosure can also be diversely modified within the usual conceivable scope by one skilled in the art. For example, the present disclosure can be applied to a striking device configured to strike a fastener by different means.

Second Embodiment

Figure 7A:
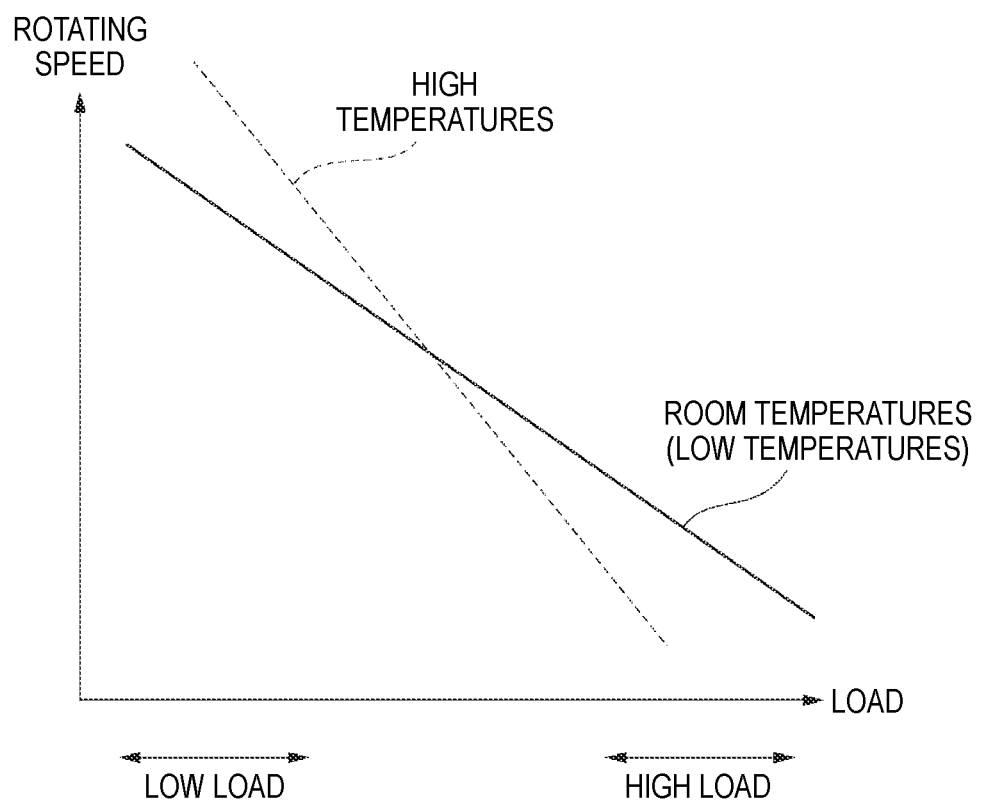
FIG. 7A is a pictorial view depicting a characteristic of the motor.

In the below a striking device of a second embodiment is described. The constitutional elements having the same or similar functions as or to those of the first embodiment are denoted with the same names and the descriptions thereof are omitted. The inventors noticed that a characteristic of a motor varies by temperatures. When the motor (particularly, a brushless motor) is at high temperatures in a high-load region, the number of rotations is reduced, as compared to a case of room temperatures. On the other hand, when the motor is at high temperatures in a low-load region, the number of rotations is increased, as compared to a case of room temperatures. FIG. 7A is a pictorial view depicting the characteristic of the motor in a simple form.

Figure 7B:
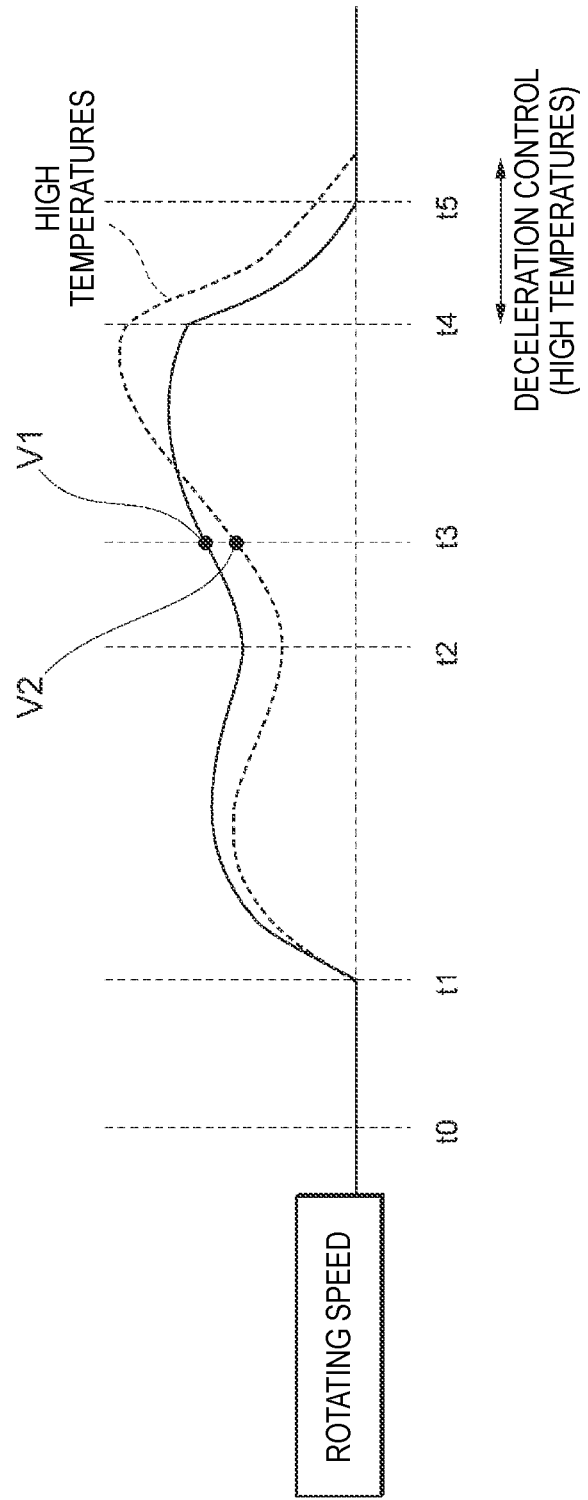
FIG. 7B is a graph depicting a rotating speed of the motor 18 at high temperatures.

In the striking device of the first embodiment, the motor is in the high load at the reference position (in the vicinity of the local maximum point A at time t3) detected in the flowchart shown in FIG. 5. On the other hand, upon start of the stop control (at time t4), the motor is in the low load. For this reason, as shown in FIG. 7B, the rotating speed V2 of the motor in the vicinity of the local maximum point A at high temperatures is lower than the rotating speed V1 at room temperatures. On the other hand, the rotating speed of the motor during the deceleration control time period (from time t4 to time t5) is higher, as compared to the room temperatures. For this reason, if the same deceleration control as the case of the room temperatures (low temperatures) is applied at the high temperatures, the stop position of the plunger may deviate toward the top dead point-side.

Therefore, the striking tool of the present embodiment includes a control unit having a temperature sensor configured to acquire temperature information indicative of a temperature of the motor, and configured to control the motor based on the temperature information. More specifically, stop control under low temperature that is applied at room temperatures (low temperatures) and stop control under high temperature that is applied at high temperatures are different. If the stop control under high temperature is applied at room temperatures, the plunger is stopped on a further bottom dead point-side than an original stop position, and if the stop control under low temperature is applied at high temperatures, the plunger is stopped on a further top dead point-side than an original stop position. For example, the amount of rotation for stop determination is corrected based on the temperature information, and the amount of rotation for stop determination is set smaller at high temperatures, as compared to room temperatures (low temperatures).

By adopting the above configuration, it is possible to stabilize the stop position of the plunger. The above configuration may also be applied to the striking device 10 of the first embodiment or the other striking devices. If the above configuration is applied to the striking device 10, it is preferably applied as described above when calculating the amount of rotation for stop determination (step S23), for example.

Note that, the temperature sensor may also be provided to the motor. Alternatively, as for the temperature sensor, a sensor for acquiring information having correlativity with the temperatures of the motor (temperature information of the battery, substrate temperature information of the inverter circuit 20A, internal temperature information of the striking device). For example, the temperature sensor may be provided to the FET of the inverter circuit.

Third Embodiment

A striking device of the third embodiment is described. The constitutional elements having the same or similar functions as or to those of the other embodiments are denoted with the same names and the descriptions thereof are omitted. The inventors noticed that the characteristic of the motor varies due to an internal resistance of the battery. In the high-load region, the number of rotations of the motor (particularly, a brushless motor) is reduced in a battery having a relatively high internal resistance, as compared to a battery having a low internal resistance.

Therefore, the striking tool of the present embodiment includes a unit configured to acquire information indicative of an internal resistance of the battery and a control unit configured to control the motor based on the information. More specifically, stop control that is applied to a battery having a relatively low internal resistance and stop control that is applied to a battery having a relatively high internal resistance are different.

Note that, the internal resistance of the battery can be estimated based on information from a circuit for identifying a battery lineup (capacity difference) of the battery. In this case, a CPU configured to acquire identification information from the battery corresponds to a unit configured to acquire the information indicative of the internal resistance. In addition, the information indicative of the internal resistance may be acquired by acquiring information having correlativity with the internal resistance.

By adopting the above configuration, it is possible to stabilize the stop position of the plunger. The above configuration may also be applied to the striking device 10 of the first embodiment or the other striking devices. If the above configuration is applied to the striking device 10, when calculating the amount of rotation for stop determination (step S23), for example, the amount of rotation for stop determination can be corrected based on the information indicative of the internal resistance.

The inventors also noticed that when the striking device is continuously driven, a voltage drop of the battery power supply occurs during the operation of the motor and the characteristic of the motor varies according to an amount of voltage drop. The amount of voltage drop of the battery power supply during the operation of the motor varies depending on a battery capacity, a cell type, aging deterioration, and individual variation, and changes according to an internal temperature of a cell.

Therefore, the striking tool includes a unit configured to acquire information indicative of an amount of voltage drop of a battery power supply during an operation of the motor and a control unit configured to control the motor based on the information.

Note that, as for the amount of voltage drop, a voltage detection circuit may be provided to a battery, a substrate to which the battery is connected or a substrate on which the inverter circuit is mounted, or may be indirectly provided to the FET of the inverter circuit or the phase voltage detection circuit, so as to acquire the amount of voltage drop.

By adopting the above configuration, it is possible to stabilize the stop position of the plunger. The above configuration may also be applied to the striking device 10 of the first embodiment or the other striking devices.

Fourth Embodiment

In the below, a striking device of a fourth embodiment is described. The constitutional elements having the same or similar functions as or to those of the first embodiment are denoted with the same names and the descriptions thereof are omitted. A control circuit of the striking device of the fourth embodiment is configured to control the motor 18 without using the information indicative of the amount of variation in rotating speed shown in (G) of FIG. 3. The control circuit is configured to control the motor 18 based on information indicative of the rotating speed of the rotor shown in (F) of FIG. 3.

The striking device includes a microswitch configured to detect that the plunger 22 is at the top dead point. The striking device also includes a Hall IC for detecting the rotating speed of the rotor of the motor 18. The control circuit is configured to start the stop control process for the plunger 22 by time control based on the detection of the top dead point by the microswitch.

Here, the control circuit is configured to control the motor 18 based on the rotating speed of the rotor detected from the Hall IC.

For example, the control circuit is configured to acquire a maximum value of the rotating speed of the rotor (a maximum value of the rotating speed of the rotor occurring during a time period from time t3 to time t4 in (F) of FIG. 3), and to change a time to start the stop control process for the plunger, based on the maximum value.

Specifically, when the rotor rotates at the first rotating speed, the stop control process is started since a first time elapses after detection of the top dead point. On the other hand, when the rotor rotates at the second rotating speed lower than the first rotating speed due to temporal change, a decrease in battery voltage and the like, the stop control process is started since a second time longer than the first time elapses. In this way, by delaying the timing to start the stop control process for the plunger 22, it is possible to control the motor 18 to stop the plunger 22 at the first position, which is the same as when the rotor rotates at the first rotating speed, or in the vicinity of the first position. Note that, a control signal pattern where the duty ratio in the stop control process is set larger when the rotor rotates at the second rotating speed than when the rotor rotates at the first rotating speed may be prepared to stop the plunger 22 at the first position, which is the same as when the rotor rotates at the first rotating speed, or in the vicinity of the first position.

The present disclosure can be diversely modified without departing from the gist thereof. For example, in the first embodiment and the like, the timing to start the deceleration control is determined based on the amount of rotation of the rotor that is counted from the reference position (step S26). Instead of or in addition to this configuration, the timing to start the deceleration control may be determined based on a time that is counted from the reference position. In this case, in step S25, instead of the amount of rotation or in addition to the amount of rotation, (a count value indicating) the elapsed time may be counted, and the timing to start the deceleration control may be determined based on the counted elapsed time.

In the first embodiment and the like, the stop control may be performed using a position detection sensor such as a brake switch. A different sensor may also be used as a unit for detecting a position. For example, an impact upon actual striking may be detected by an acceleration sensor or a shock sensor and a position of the plunger may be detected based on the detected impact. As compared to the microswitch, since such a sensor can suppress deterioration due to wear of the contact point, it is possible to expect improvement on the durability and it may be advantageous in terms of cost. The sensor may be mounted on the printed circuit board on which the inverter circuit is mounted or may be installed at a position on any one side in the striking device. In addition, some of the constitutional elements in the first embodiment can be added to the second embodiment within the usual conceivable scope by one skilled in the art. Further, some of the constitutional elements in any embodiment can be replaced with the corresponding constitutional elements in other embodiments.

The aforementioned embodiments are summarized as follows.

A striking tool of the aforementioned embodiments includes: a motor including a rotor; a plunger configured to be movable from a bottom dead point to a top dead point by the motor; a moving unit configured to move the plunger from the top dead point toward the bottom dead point; a speed variation acquiring unit configured to acquire an amount of variation in rotating speed of the rotor; and a control unit configured to control the motor, based on the amount of variation acquired by the speed variation acquiring unit.

The inventors noticed that an amount of variation in rotating speed of the rotor in the striking device may have a specific pattern, and conceived a configuration of controlling the motor based on the notice. For example, even when an absolute value of the rotating speed varies due to a decrease in battery voltage, for example, the amount of variation in rotating speed of the rotor may exhibit a similar pattern. The control unit can acquire the amount of variation in rotating speed, and control the motor based on the acquired amount of variation. Therefore, even when the absolute value of the rotating speed varies, the stop position of the plunger can be stabilized. Even when the start load increases and it is thus difficult to detect the peak in current, the stop position of the plunger can be stabilized by acquiring the amount of variation in rotating speed of the motor and controlling the motor based on the acquired amount of variation.

For example, the control unit can detect a local maximum point of the amount of variation in rotating speed and control the motor based on the local maximum point. However, the present disclosure is not limited to the local maximum point of the amount of variation in rotating speed. For example, a feature that is a little effected by a variation factor of the stop position of the plunger may be detected and the motor may be controlled based on the feature.

As used herein, the "amount of variation in rotating speed" may be information indicative of the amount of variation in rotating speed. For example, a value of a counter that varies according to the amount of variation in rotating speed is included. The "amount of variation in rotating speed" also includes information indicative of a change rate of the rotating speed.

The control unit may also be configured to control the stop position of the plunger, based on the amount of variation in rotating speed. For example, the control unit may be configured to detect a local maximum point of the change rate of the rotating speed, based on the amount of variation in rotating speed, and set an amount of rotation until the motor is stopped, based on the time of detection. The stop position of the plunger varies according to the amount of rotation until the motor is stopped. For this reason, setting the amount of rotation until the motor is stopped corresponds to controlling the stop position of the plunger. Note that, the control unit may also be configured to control the stop position of the plunger, based on a change of the change rate of the rotating speed and a change rate of the change rate of the rotating speed, in addition to the local maximum point of the change rate of the rotating speed. For example, the control unit may be configured to detect one or more inflection points of the rotating speed and control the stop position of the plunger based on the inflection points.

The control unit may also be configured to start deceleration control for decelerating the rotor, based on the amount of variation in rotating speed.

A striking tool of the aforementioned embodiments includes: a motor including a rotor; a plunger configured to be movable from a bottom dead point to a top dead point by the motor; a moving unit configured to move the plunger from the top dead point toward the bottom dead point; a speed acquiring unit configured to acquire a rotating speed of the rotor; and a control unit configured to control the motor, based on the rotating speed acquired by the speed acquiring unit.

The inventors noticed that the rotating speed of the motor may vary according to a battery voltage, wear of a component and the like and is a factor to determine the stop position of the plunger, and conceived a configuration of acquiring the rotating speed of the motor and controlling the motor based on the rotating speed of the motor.

According to the striking tool, it is possible to control the motor, based on the rotating speed. Even when the absolute value of the rotating speed varies due to a decrease in battery voltage, for example, it is possible to stabilize the stop position of the plunger by acquiring the rotating speed of the motor and controlling the motor based on the rotating speed. In addition, even when the start load increases and it is thus difficult to detect the peak in current, it is possible to stabilize the stop position of the plunger by acquiring the rotating speed of the motor and controlling the motor based on the rotating speed.

As used herein, the "rotating speed" may be information indicative of the rotating speed. For example, a value that varies according to the rotating speed is included.

The control unit may be configured to control the stop position of the plunger, based on the rotating speed. For example, the control unit may set the amount of rotation until the motor is stopped, based on the rotating speed. The stop position of the plunger varies according to the amount of rotation until the motor is stopped. For this reason, setting the amount of rotation until the motor is stopped corresponds to controlling the stop position of the plunger.

When the rotor rotates at a first rotating speed, the control unit may be configured to control the motor to stop the plunger at a first position, and when the rotor rotates at a second rotating speed, the control unit may be configured to control the motor to stop the plunger at the first position. According to this configuration, even when the rotating speed of the rotor is different, the plunger can stop at the same first position. In the meantime, the first position includes substantially the same range. Note that, a time (response time) until the plunger at a standby position executes striking of a fastener is 0.1 second or shorter.

The control unit may also be configured to start deceleration control for stopping rotation of the rotor, based on the rotating speed.

Note that, the amount of variation or the rotating speed may be acquired based on a phase voltage or a phase current of a stator winding of the motor.

The invention claimed is:

1. A striking tool comprising:
a motor including a rotor;
a plunger configured to be movable from a bottom dead point to a top dead point by the motor;
a moving unit configured to move the plunger from the top dead point toward the bottom dead point;
a speed variation acquiring unit configured to acquire a rate of change in rotating speed of the rotor; and
a control unit configured to control the motor, based on the rate of change acquired by the speed variation acquiring unit,
wherein the speed variation acquiring unit is configured to acquire the rate of change in rotating speed of the rotor by:
determining a first rotating speed of the rotor at a first time;
determining a second rotating speed of the rotor at a second time later than the first time; and
calculating a difference between the first rotating speed of the rotor and the second rotating speed of the rotor, and
wherein the control unit is configured to detect a position of the plunger based on the rate of change acquired by the speed variation acquiring unit.

2. The striking tool according to claim 1, wherein the control unit is configured to start decelerating the rotor, based on the rate of change.

3. The striking tool according to claim 1, wherein the motor comprises a stator winding, and
wherein the rate of change is acquired based on a phase voltage of the stator winding.

4. The striking tool according to claim 1, wherein the motor comprises a stator winding, and
wherein the rate of change is acquired based on a phase current of the stator winding.

5. The striking tool according to claim 1, wherein the control unit is configured to compare an acquired rate of change in rotating speed of the rotor with a previously acquired rate of change in rotating speed of the rotor.

6. The striking tool according to claim 1, where the control unit is configured to determine whether the acquired rate of change in rotating speed exceeds a threshold value.

7. The striking tool according to claim 1, wherein the control unit is configured to determine whether the acquired rate of change in rotating speed of the rotor has reached a local maximum point.

8. A striking tool comprising:
a motor including a rotor;
a plunger configured to be movable from a bottom dead point to a top dead point by the motor;
a moving unit configured to move the plunger from the top dead point toward the bottom dead point;
a speed variation acquiring unit configured to acquire a rate of change in rotating speed of the rotor; and
a control unit configured to control the motor, based on the rate of change acquired by the speed variation acquiring unit, wherein the speed variation acquiring unit is configured to acquire the rate of change in rotating speed of the rotor by:
  determining a first rotating speed of the rotor at a first time;
  determining a second rotating speed of the rotor at a second time later than the first time; and
  calculating a difference between the first rotating speed of the rotor and the second rotating speed of the rotor, and
wherein the control unit is configured to control a stop position of the plunger based on the rate of change.

9. The striking tool according to claim 8, wherein the control unit is configured to start decelerating the rotor, based on the rate of change.

10. The striking tool according to claim 8, wherein the motor comprises a stator winding, and
  wherein the rate of change is acquired based on a phase voltage of the stator winding.

11. The striking tool according to claim 8, wherein the motor comprises a stator winding, and
  wherein the rate of change is acquired based on a phase current of the stator winding.

12. The striking tool according to claim 8, wherein the control unit is configured to compare an acquired rate of change in rotating speed of the rotor with a previously acquired rate of change in rotating speed of the rotor.

13. The striking tool according to claim 8, where the control unit is configured to determine whether the acquired rate of change in rotating speed exceeds a threshold value.

14. The striking tool according to claim 8, wherein the control unit is configured to determine whether the acquired rate of change in rotating speed of the rotor has reached a local maximum point.

15. A striking tool comprising:
  a motor including a rotor;
  a plunger configured to be movable from a bottom dead point to a top dead point by the motor;
  a moving unit configured to move the plunger from the top dead point toward the bottom dead point;
  a speed acquiring unit configured to acquire a rotating speed of the rotor;
  a speed variation acquiring unit configured to acquire a rate of change in rotating speed of the rotor by:
    determining a first rotating speed of the rotor at a first time;
    determining a second rotating speed of the rotor at a second time later than the first time; and
    calculating a difference between the first rotating speed of the rotor and the second rotating speed of the rotor; and
  a control unit configured to control the motor, based on the first or second rotating speed acquired by the speed acquiring unit and the rate of change in rotating speed of the rotor acquired by the speed variation acquiring unit, and configured to control a stop position of the plunger based on the first or second rotating speed and the rate of change.

16. The striking tool according to claim 15, wherein the control unit is configured to compare the acquired rate of change in rotating speed of the rotor with a previously acquired rate of change in rotating speed of the rotor.

17. The striking tool according to claim 15, wherein the control unit is configured to determine whether the acquired rate of change in rotating speed exceeds a threshold value.

18. The striking tool according to claim 15, wherein the control unit is configured to determine whether the acquired rate of change in rotating speed of the rotor has reached a local maximum point.

* * * * *